United States Patent [19]
Shuman, Jr.

[11] Patent Number: 5,899,223
[45] Date of Patent: May 4, 1999

[54] COMPACT GAS PRESSURE REGULATOR

[75] Inventor: Clyde W. Shuman, Jr., Schnecksville, Pa.

[73] Assignee: Precision Medical, Inc., Northampton, Pa.

[21] Appl. No.: 08/744,423

[22] Filed: Nov. 8, 1996

[51] Int. Cl.⁶ ............................. F16K 31/12; F16K 37/00
[52] U.S. Cl. ...................... 137/505.25; 137/557; 251/148
[58] Field of Search ......................... 137/505.25, 505.41, 137/557, 501, 504; 251/148

[56] References Cited

U.S. PATENT DOCUMENTS

| | | | |
|---|---|---|---|
| 3,495,607 | 2/1970 | Shugarman | 137/557 X |
| 3,693,652 | 9/1972 | Iung | 137/557 |
| 4,173,986 | 11/1979 | Martin | 137/505.25 X |
| 4,366,947 | 1/1983 | Voege | 251/206 |
| 4,572,477 | 2/1986 | Phlipot et al. | 251/285 |
| 4,643,215 | 2/1987 | Phlipot et al. | 137/15 |
| 4,655,246 | 4/1987 | Phlipot et al. | 137/505.11 |
| 4,887,637 | 12/1989 | Ketner | 137/504 |
| 5,143,116 | 9/1992 | Skoglund | 137/501 X |
| 5,282,493 | 2/1994 | Schwartz et al. | 137/557 X |
| 5,497,803 | 3/1996 | Ferrante | 251/148 X |
| 5,509,407 | 4/1996 | Schuler | 137/505.25 X |
| 5,614,679 | 3/1997 | Johnson | 137/557 X |
| 5,704,589 | 1/1998 | Canuteson | 137/557 X |

FOREIGN PATENT DOCUMENTS 692653  6/1953  United Kingdom .............. 137/505.25

*Primary Examiner*—John Rivell
*Attorney, Agent, or Firm*—Richard P. Gilly

[57] ABSTRACT

A compact, gas pressure regulator makes use of a substantially disc-shaped member which is biased within the regulator by one or more spring members exerting forces on the disc-shaped member at multiple, discrete locations which are angularly separated from each other about the area of the first surface. Movement of the disc-shaped member toward or away from a high pressure orifice maintains a regulated, lower pressure for delivery through an outlet in the regulator. A member for mounting a pressure gauge is secured to the housing of the pressure regulator without substantially increasing the overall length of the regulator.

20 Claims, 5 Drawing Sheets

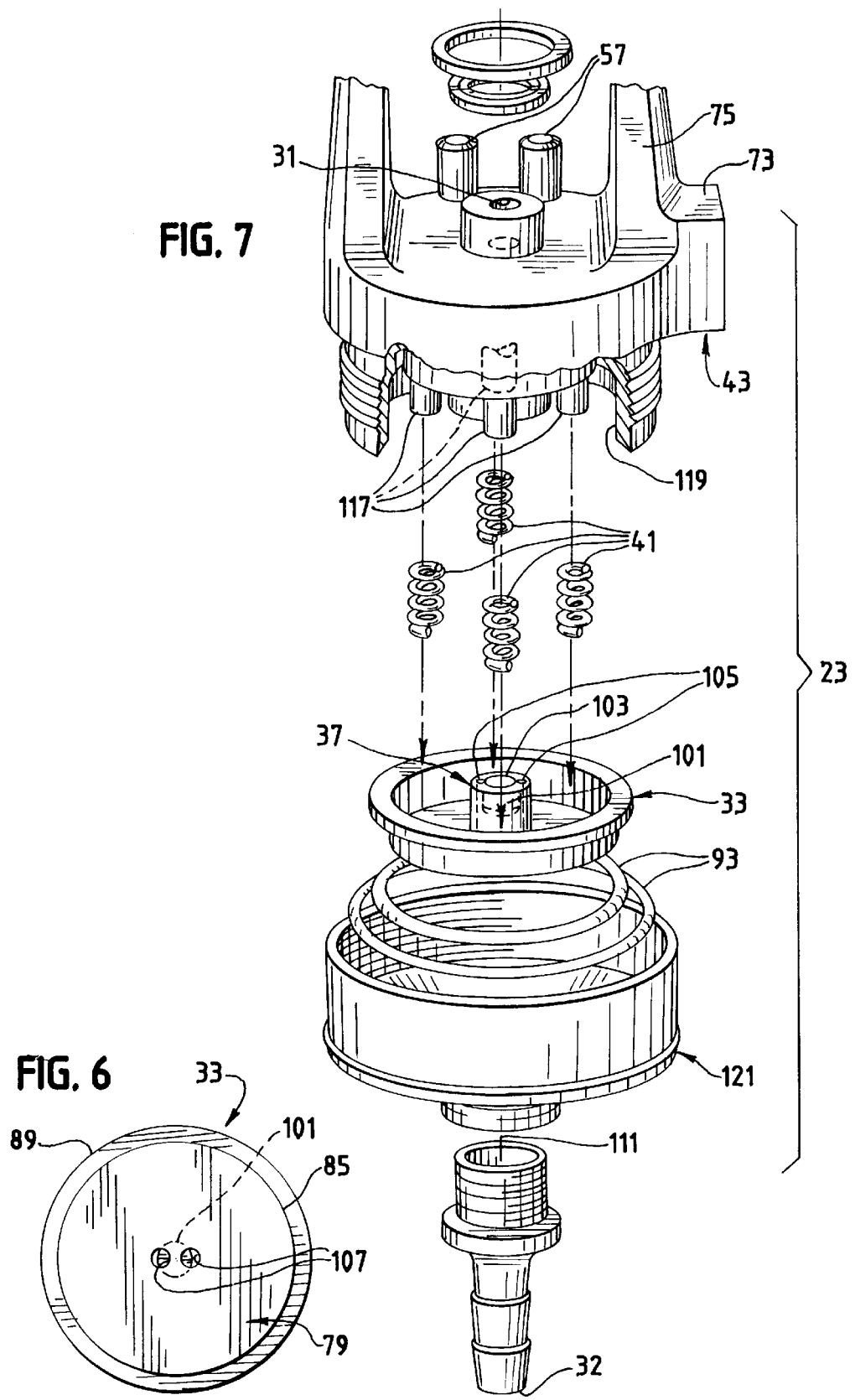

COMPACT GAS PRESSURE REGULATOR

FIELD OF THE INVENTION

This invention relates to devices for controlling the pressure of gas, such as oxygen, and more particularly, to a compact gas pressure regulator.

BACKGROUND

Pressure regulators are generally used in conjunction with cylinders or other sources of pressurized gas, such as oxygen. Pressure regulators are sometimes used in conjunction with relatively compact cylinders which contain gas under relatively high pressure of between about 500 and about 3,000 psi. The gas cylinder and pressure regulator connected thereto form a gas delivery apparatus. Gas pressure regulators find use in a variety of medical applications, such as for emergency treatment, and for hospital and clinical usages. Gas delivery systems are also used by ambulatory medical patients, in nursing facilities, and in home-care environments.

In many medical or commercial applications, the gas or oxygen from such high pressure source is to be delivered at a constant, lower pressure appropriate for the particular application. Gas delivery often must also be accomplished at a constant flow rate and, accordingly, gas delivery apparatus often use flow control valves in conjunction with gas pressure regulators.

Gas pressure regulators used in gas delivery apparatus suffer from various drawbacks and disadvantages. Gas pressure regulators such as that shown in U.S. Pat. No. 4,655,246 have undesirably lengthy profiles and use an undesirably large amount of material thickness to attain the ruggedness required for safe and effective operation. The amount of material used in these and other pressure regulators contributes unnecessarily to excessive weight.

The disadvantages of excessive weight and an excessively long profile are often amplified when current pressure regulators are used in conjunction with compact, high pressure cylinders. When the pressure regulator is connected to such a compact cylinder, it often extends beyond the cross-sectional footprint of the cylinder. This means that if the cylinder were to tip over or otherwise come into sudden contact with another surface, the pressure regulator attached to such cylinder risks being struck by an unyielding surface and potentially damaged. The length and weight of current pressure regulators may also significantly raise the center of gravity of such compact gas cylinders, thereby making them difficult to manipulate and prone to tipping over.

When the gas delivery apparatus needs to be transported, such as in mobile medical applications or with an ambulatory patient, the weight of the pressure regulator takes on increased significance and the disadvantage of excessive weight is amplified further.

Accordingly, there is a need for a gas pressure regulator and an associated air delivery apparatus free of the drawbacks and disadvantages outlined above.

There is a further need for the gas pressure regulator to be lightweight yet suitably rugged, compact, and dimensioned so as to avoid inadvertent damage when used in a variety of applications.

SUMMARY OF THE INVENTION

It is an object of this invention to overcome the shortcomings of the prior art by providing a compact gas pressure regulator which includes a housing with a chamber therein. The chamber is sealed from the atmospheric pressure outside the housing. An orifice is located in the housing for receiving gas from a source, and an outlet is also provided in the housing through which gas is delivered at a delivery pressure which is lower than the pressure of the source. Within the chamber is a substantially disc-shaped member which has a center and two, opposite surfaces. One of the surfaces includes a seat having a first surface area which faces the orifice; the other surface has a second surface area larger than the first surface area and forms a head region in conjunction with one of the walls of the chamber. The head region is in pneumatic communication with the gas outlet. One or more spring members are positioned within the chamber to be biased against the disc-shaped member. The spring member or members exert forces against the disc-shaped member at locations which are angularly spaced about the area of the disc-shaped member. When pressurized gas is present in a pressurized zone of the chamber, the disc-shaped member and the seat are moved toward the orifice and against the bias of the springs to regulate the delivery pressure.

In one version of the invention, there are multiple spring members which are helical springs with longitudinal spring axes. The housing is generally cylindrical and has a predetermined length. A mounting member for a pressure gauge is located on the housing in such a way to avoid substantially increasing the predetermined length of the cylindrical housing.

According to another aspect of the invention, there are four springs spaced symmetrically about the first surface of the disc-shaped member. Pins extend from a transverse inner wall of the housing and receive the springs thereon. The springs extend between the transverse inner wall and the disc-shaped member. The springs are selected to resist movement of the seat toward the orifice in sufficient amount to maintain the delivery pressure under 100 psi.

In another version of the invention, there is a single spring member comprising a spring washer, also known as a wave washer. The peaks and valleys of the spring washer exert angularly spaced forces against the disc-shaped member.

BRIEF DESCRIPTION OF THE DRAWINGS

There is shown in the drawings an exemplary embodiment of the invention as presently preferred. It should be understood that the invention is not limited to the embodiment disclosed and is capable of variation within the scope of the appended claims.

In the drawings,

FIGS. 4, 5 and 6 are top plan, side sectional, and bottom plan views, respectively, of the disc-shaped member of the present invention;

FIG. 7 is an exploded, perspective view of the regulator shown in FIGS. 1–6.

DETAILED DESCRIPTION OF THE INVENTION

Figure 1:
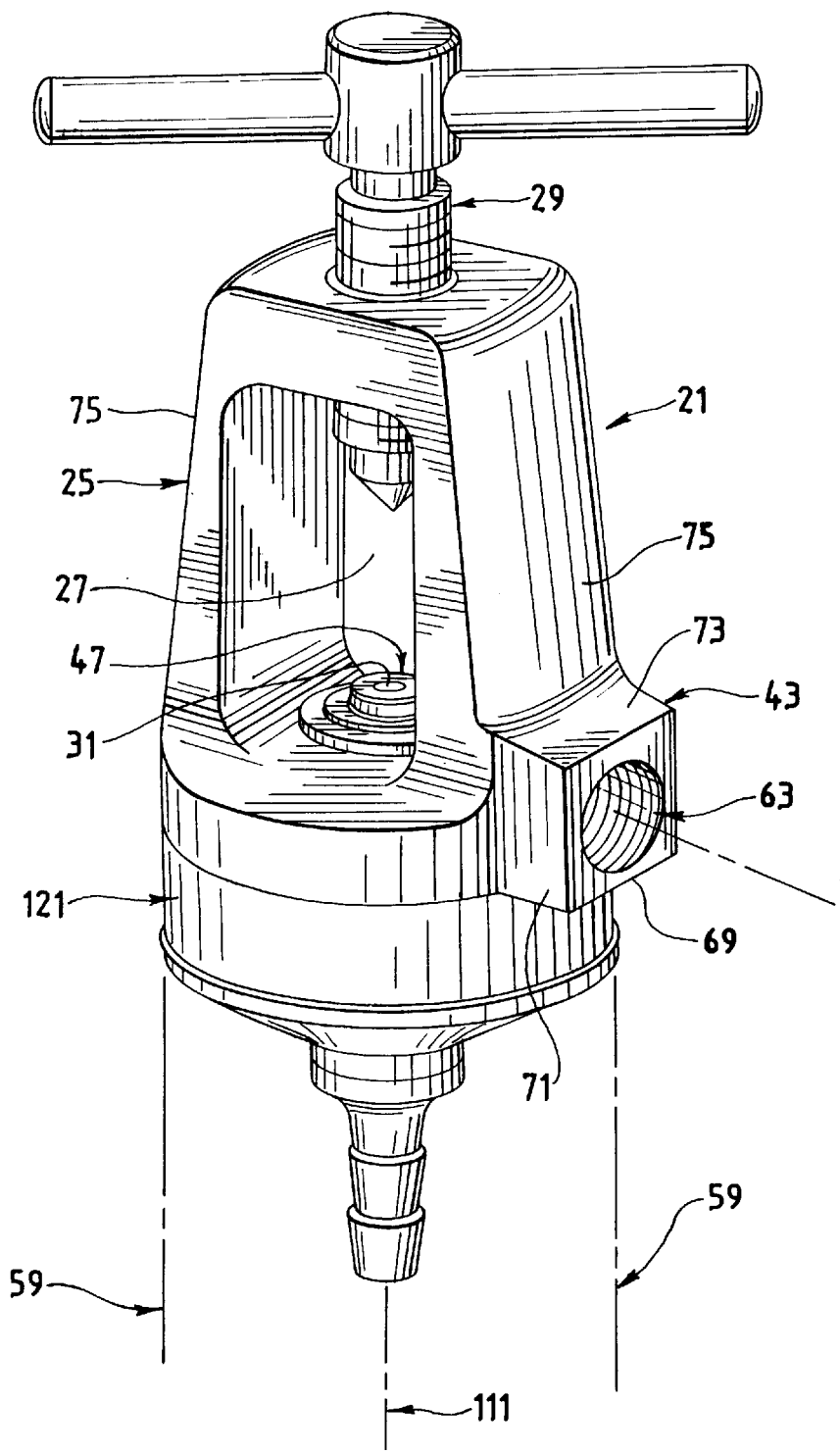
FIG. 1 is a perspective view of a gas pressure regulator incorporating the principles of the present invention.

Referring now to the drawings, and in particular to FIGS. 1 and 7, a gas pressure regulator 21 is shown having a housing 23 and a substantially, U-shaped yoke or bracket 25 extending from the end of housing 23. Yoke 25 has a pair of substantially parallel arms 75 which in part define an aperture 27 into which a source of pressurized gas, such as a cylinder (not shown), may be received. A T-clamp 29 is threadably received through a bore in the end of the yoke 25 and is used to secure the gas cylinder or other pressurized gas source to the pressure regulator 21. An orifice 31 extends through the housing as explained in more detail below and has one of its openings in communication with the aperture 27 of the yoke 25. In this way, orifice 31 may be hooked up to the gas cylinder to receive gas at a source pressure.

Figure 2:
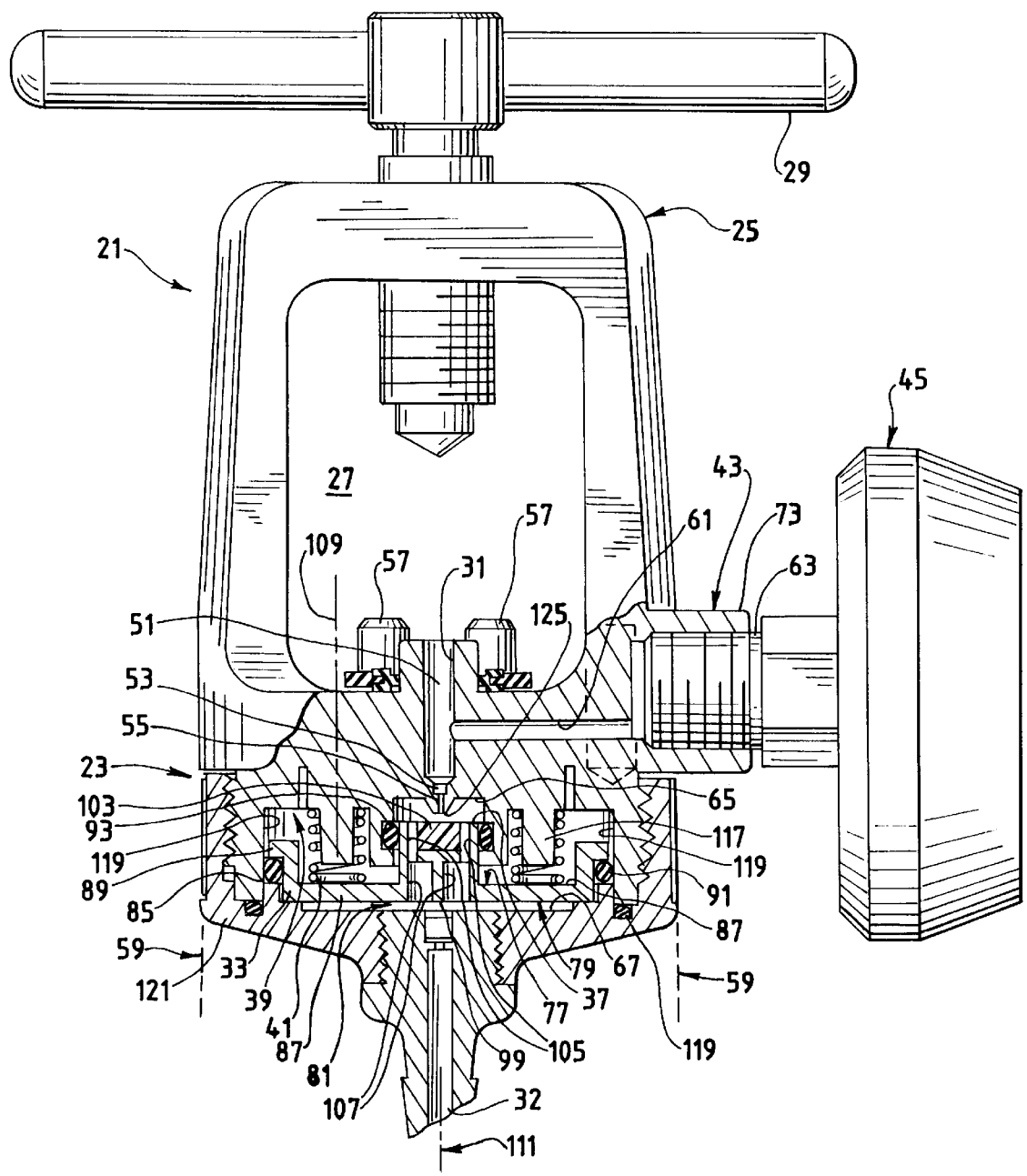
FIG. 2 is a side, sectional view of the regulator of FIG. 1.

Referring to FIG. 2, a chamber 39 is formed within housing 23. In general terms, gas passes through orifice 31, through a pressurized zone of chamber 39, and is delivered through outlet 32 at a regulated, delivery pressure lower than the source pressure.

Figure 5:
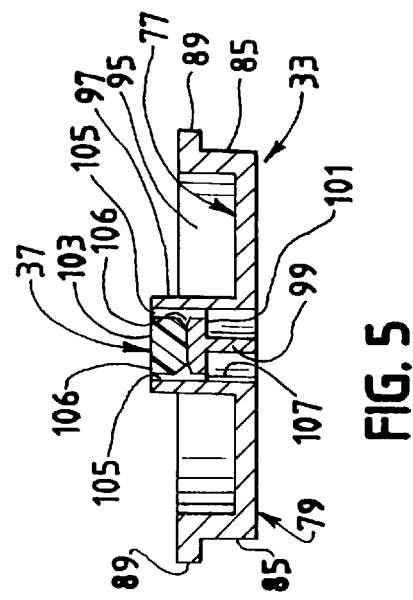

Referring now to FIGS. 2 and 5, a substantially disc-shaped member 33 is movably mounted within the housing 23. A spring means, here shown as multiple, springs 41, is biased against disc-shaped member 33 at locations which are radially spaced from center 99 of disc-shaped member 33. Springs 41 exert force on disc-shaped member 33 at multiple, discrete locations which are angularly separated from each other about the area of the surface of disc-shaped member 33. In this embodiment, then, each spring 41 is angularly separated from an adjacent one of the springs 41 by an angle of about 90°. Accordingly, spring force is exerted at four, discrete locations on disc-shaped member 33 separated by about an angle of 90°. Thus, when the forces are described as being exerted at discrete, angularly separated locations, this means that there is a distance between adjacent force locations, and this distance is an arc length on the surface of the disc-shaped member 33. In other words, if a first ray were to be imagined from center 99 to the location of one of the forces, the other force locations could be located by corresponding rays which form an angle with the first ray.

The substantially planar shape of disc-shaped member 33 and angularly separated springs 41 permits the axial length of housing 23, including chamber 39, to be relatively compact, an important feature of the present invention.

Another feature of the present invention is a member 43 for mounting a pressure gauge 45 (FIG. 2) on housing 23 and in communication with orifice 31. Mounting member 43 is, in this embodiment, block-shaped, integral with housing 23, and is positioned without substantially increasing the overall length of housing 23, thereby reducing the amount of material needed for an operative gas pressure regulator.

Referring now to FIGS. 1, 2, and 7 orifice assembly 47 comprises a bore or orifice 31 extending longitudinally between chamber 39 and aperture 27 formed by yoke 25, and having progressively decreasing cross-sectional diameters 51–55. Orifice 31 terminates within chamber 39 at a terminal opening 125. Chamber 39 is partly defined by longitudinally spaced, inner walls 65, 67, which extend transversely at the ends of the chamber 39. Terminal opening 125 is located in transverse inner wall 65. A pair of mounting studs 57 proximate to the orifice 31 and extending from the outside of housing 23 into aperture 27. Mounting studs 57 are used for correctly positioning the high-pressure gas source to be connected to regulator 21.

Pressure regulator 21 is generally cylindrical, and housing 23 and chamber 39 are coaxially aligned with respect to each other along a longitudinal, central axis of symmetry 111. The housing 23 thus has a generally circular, cross-sectional footprint indicated by arrows 59. Mounting member 43 extends outwardly from footprint 59 without substantially increasing the length of housing 23. A passageway 61 communicates between bore 63 in mounting member 43 and orifice 31. In this way, pressure gauge 45 may be used to read the source pressure entering orifice 31.

Although mounting member 63 may assume a variety of overall shapes, in this embodiment the member 43 comprises a block having a side 69 which extends outwardly from housing 23 in a direction transverse to the longitudinal axis 111 of regulator 21, and in a plane which is substantially coplaner with that containing the inner chamber wall 65. The block further comprises longitudinal sides 71 which likewise extend outwardly from housing 23 and thus beyond the circular footprint 59 of regulator 21. The longitudinal sides 71 extend longitudinally from the transverse side 69 to terminate at another transverse side 73 of mounting member 43. Transverse side 73 extends outwardly from the circular footprint 59 near the end of one of arms 75 of yoke 25.

Figure 3:
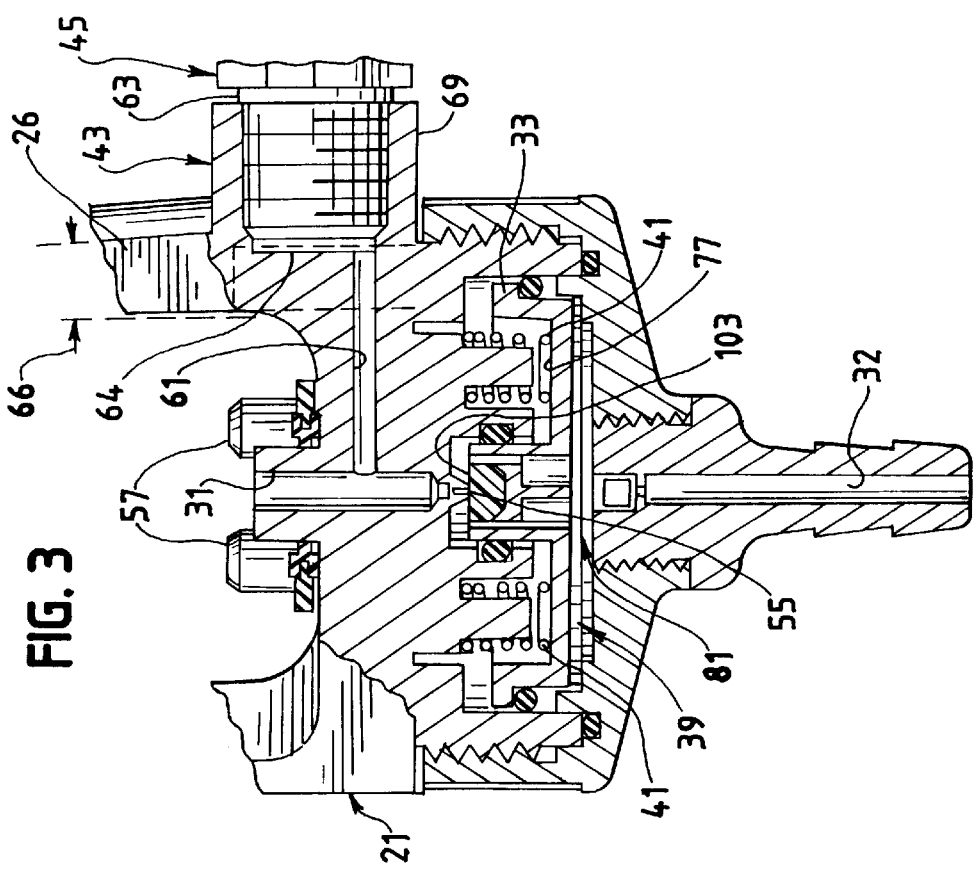
FIG. 3 is a side, sectional view showing the pressure regulator during its operation.

The above-described structure of mounting member 43 is suitably rigid to readily receive pressure gauge 45 within bore 63 while advantageously using a minimum amount of material and without substantially increasing the overall length required for the regulator 21 to function as intended. Referring now to FIG. 3, the outwardly extending sides 69, 71 and 73 allow bore 63 to have a bottom 64 (FIG. 3) positioned radial distance 66 (FIG. 3) from the inner surface of yoke arm 26. Absent sufficient outward extension of sides 69, 71, and 73, material to receive the bore 63 would need to be added between the transverse wall 65 of chamber 39 and opposite wall 68 of aperture 27 in order to operably define and accommodate the bore 63. Such additional material would undesirably increase the length and weight of the regulator 21.

Referring now especially to FIGS. 2–3, disc-shaped member 33 is axially movable within chamber 39, that it, disc-shaped member 33 is mounted within chamber 39 and capable of movement in a direction generally corresponding to the orientation of longitudinal axis 111 of regulator 21. Disc-shaped member 33 has a center 99 substantially aligned with the longitudinal axis 111, a surface 77 which generally opposes or faces orifice 31, and a surface 79 opposite the surface 77. The surface 79 generally opposes the inner wall 67 of chamber 39 and defines a head region 81 which is in communication with the outlet 32 through which gas of regulated pressure is delivered.

Figure 4:
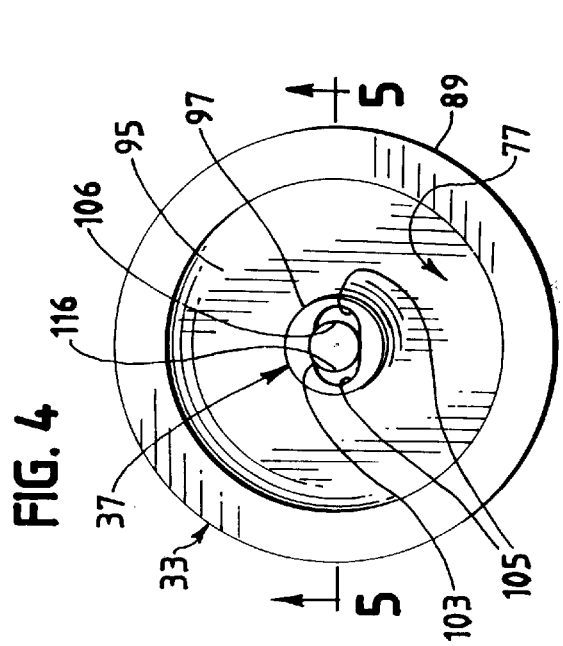

Referring also to FIGS. 4–6, disc-shaped member 33 includes a circumferential sidewall 85 which extends from a substantially planar, circular base 87 and terminates in an upper lip or flange 89. The intersection of flange 89 with sidewall 85 forms a detente 91. One of a plurality of O rings 93 (or other suitable sealing means) is located in detente 91 for creating a seal between disc-shaped member 33 and chamber 39.

A second sidewall 97 is located interiorly to the circumferential sidewall 85 and forms an inner circumference around center 99 of disc-shaped member 33. Interior sidewall 97 extends outwardly from base 87 and terminates in the form of a seat 37. Seat 37 is thus located on a projecting portion of the disc surface 77 and has formed therein a cavity 101 into which a sealing member 103 is received. While disc-shaped member 33, including seat 37, is preferably made of cast metal, sealing member 103 is preferably formed of polymeric material which has slightly more resilience than cast metal.

A pair of passages 105 extends between opposite surfaces 77 and 79 of disc-shaped member 33. Passages 105 extend longitudinally from seat 37 and through interior sidewall 97. Longitudinal portions 106 of passages 105 proximate to the seat 37 are in communication with cavity 101. As best seen in FIGS. 2, 3 and 5 passages 105 have sections 107 of enlarged cross section beginning below cavity 101 (FIG. 5), and such sections 107 extend from below cavity 101 to the disc surface 79. Passages 105 thus permit pressurized gas to flow from one side of the disc-shaped member 33 to the other, and the geometry and location of passages 105 allow them to be formed at the time disc member 33 is cast, rather than by subsequent and additional machining steps.

Seat 37 has a surface area which is less than that of surface 79 of disc-shaped member 33. Accordingly, sufficient pressure in head region 81 induces longitudinal movement of seat 37 toward orifice 125.

Sidewalls 85, 97 define an annular trough 95 on disc surface 77. The springs 41 are received in the annular trough 95 and extend outwardly from surface 77 at locations which are radially spaced from center 99 of disc-shaped member 33. In the embodiment shown, four of the springs 41 are formed identically and spaced symmetrically around annular trough 95. Thus, each of the springs 41 is angularly spaced from an adjacent one of the springs 41 by an angle of about 90 degrees. Springs 41 are preferably helical and have longitudinal spring axes indicated at 109. Spring axes 109 are laterally spaced from and substantially parallel to the longitudinal, central chamber axis 111. In this way, each of the four springs 41 exert a force substantially in the direction of spring axes 109 against disc-shaped member 33 at four corresponding locations which are radially spaced from center 99 of disc-shaped member 33. As such, multiple, non-coaxial forces are distributed substantially evenly over surface 77 during operation of regulator 21 as discussed subsequently.

One end of springs 41 is biased against disc-shaped member 33 in annular trough 95. The opposite end of springs 41 is biased against transverse inner surface 65. Transverse inner surface 65 faces or opposes surface 77 of disc-shaped member 33. Pins 117 extend outwardly from surface 65 toward disc surface 77 and extend at least partly into annular trough 95. Springs 41 are longitudinally received by pins 117. The springs 41 are thus interposed between the surface 65 and the disc-shaped member 33.

Chamber 39 has been provided with means for sealing the chamber 39, here shown as O-rings 93, thereby creating a zone within chamber 39 which can be brought above atmospheric pressure when a source of gas is connected to regulator 21. O-rings 93 are positioned to form seals between the transverse wall 65 and interior sidewall 97 of disc-shaped member 33, between circumferential sidewall 85 and inner chamber sidewall 119, and between endcap 121 and the chamber 33. The sealing provided by O-rings 93 creates a pressurized zone 123, which includes a region proximate to terminal end 125 of orifice 31. Pressurized zone 123 is in communication with head region 81 through passages 105, and head region 81 thus becomes a zone above atmospheric pressure as well.

The use and operation of regulator 21 is apparent from the foregoing description. When the regulator is not in use, disc-shaped member 33 is biased by springs 41 into a bottomed-out position against inner chamber wall 67, as shown in FIG. 2. When high pressure gas, such as pressurized oxygen, is received at a source pressure through orifice 31, zone 123 and head region 81 rise above atmospheric pressure, that is, become pressurized. In response to the pressure of gas received in head region 81, disc-shaped member 33 and seat 37 formed therein are urged in an axial direction toward the terminal end 125 of orifice 31. A sufficient amount of pressure in head region 81 overcomes the bias of the springs 41 and, as shown in FIG. 3, causes disc-shaped member 33 to be displaced a predetermined amount toward orifice 31. Increased pressure in head region 81 urges disc-shaped member 33 closer to terminal end 125. The rear seat 37 is to terminal end 125, the more entry of gas through terminal end 125 is inhibited.

As pressure in head region 81 decreases, springs 41 urge disc-shaped member 33 to a position further from orifice end 125 and thereby increase entry of gas therethrough. In this way, movements of disc-shaped member 33 cause regulation of the pressure delivered from head region 81 through outlet 32 in communication therewith. Movements of disc-shaped member 33 thus cause the pressure to be regulated and delivered at a substantially constant value. The outer limit of movement of seat 37 is when it contacts the terminal end 125, in which position the flow of gas through the orifice 31 is stopped until such time as the seat 37 is moved out of contact with the terminal end 125. During movement of disc-shaped member 33, interior sidewall 97 remains in contact with and is guided by, the o-ring 93 between interior sidewall 97 and the wall 65 defining the chamber 39.

Although the present invention is useful in a variety of applications, one application receives gas at a source pressure of about 2,000 psi and has been configured to maintain a delivery pressure of under 100 psi, such as at 50 psi. In such embodiment, the disc-shaped member is moved axially from its resting position shown in FIG. 2 a distance of about 0.028" to maintain a delivery pressure under 100 psi. The amount of movement of disc-shaped member 33 may also be affected by gas flow control valves (not shown) which may be attached downstream of the disc-shaped member 33. Suitable springs for delivery pressures under 100 psi have a free length of about 0.31", a cross-sectional outer diameter of about 0.20"; they are made of music wire and have a rate of 110 lb/in. Passages 105 are dimensioned to have cross-sectional areas of about 0.00192 sq. in.

Various alternatives and variations to the embodiment discussed above are also within the scope of the present invention. For example, although regulator 21 uses four of the springs 41, a greater or lesser number could equally well be used so long as the springs 41 deliver relatively uniform, forces at multiple, distributed locations spaced laterally from the longitudinal axis 11. As a further variant, pins 117 may be mounted on a separate component within the chamber 39, rather than integral with the transverse inner wall 65 as in the illustrated embodiment. Pressure regulator 21 can be equipped with any of a variety of gas flow control valves so that, in use, any of a variety of appropriate flow rates may be selected.

Figure 8:
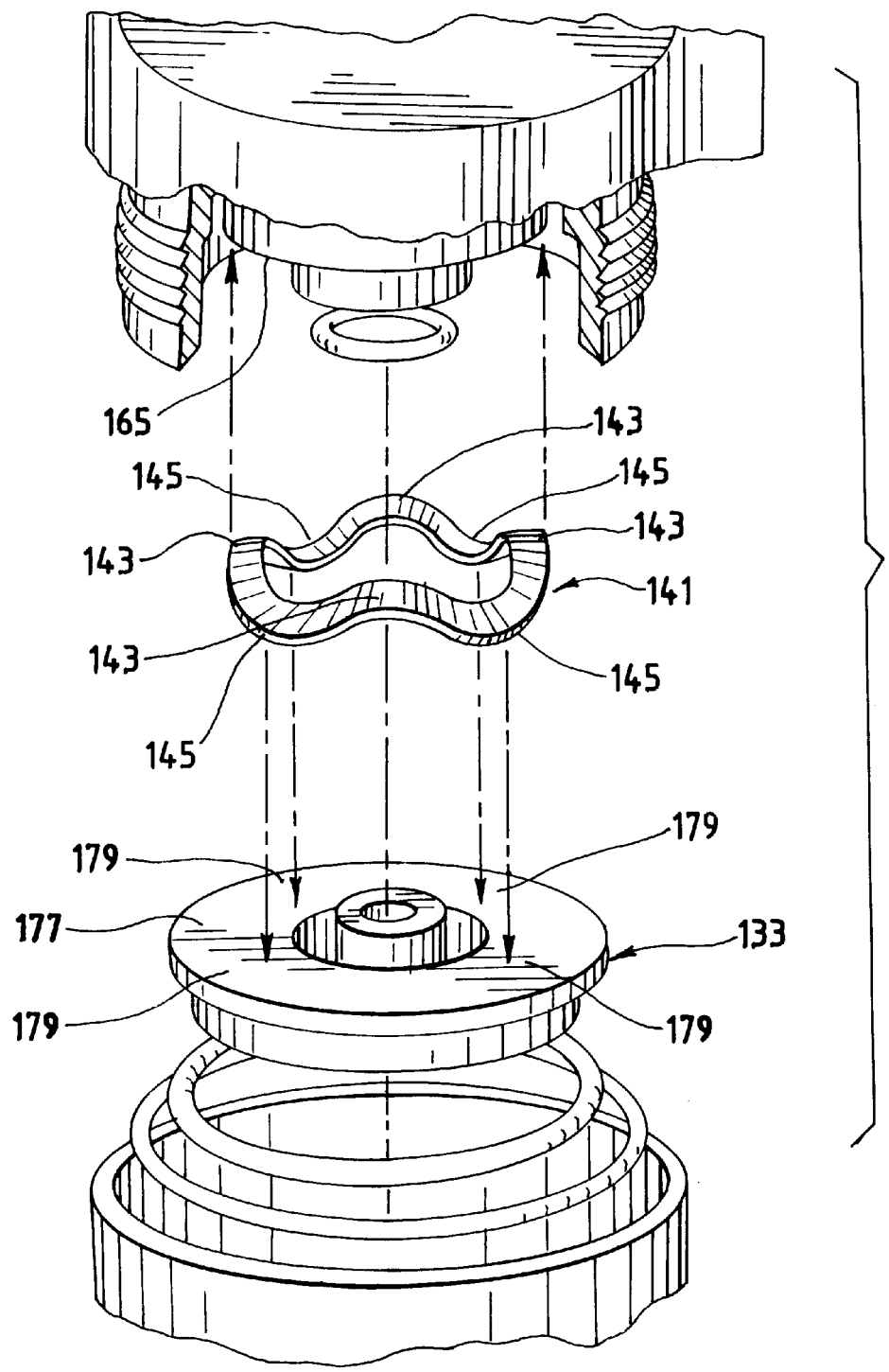
FIG. 8 is an exploded, perspective view of an alternative embodiment of the present invention.

Another alternative embodiment of the present invention is shown in FIG. 8. The four helical springs 41 have been replaced with a single spring washer 141, also known as a "wave washer" owing to the wave-like form produced by alternating peaks and valleys. The surface 177 of disc-shaped member 133 is formed to be engaged by one side of spring washer 141, while also allowing the other side of spring washer 141 to engage transverse chamber wall 165.

The spring washer has a set of four peaks 143 alternating with a set of four valleys 145. Peaks 143 engage transverse chamber wall 165 while valleys 145 engage surface 177 of disc-shaped member 133. As in the previous embodiments, the spring washer 131 exerts force on disc-shaped member 133 at multiple, discrete locations 179 which are angularly separated from each other about the area of the surface 177.

In addition to the advantages apparent from the foregoing description, the present invention has a length which is sufficiently limited so as not to extend beyond the cross-sectional footprint of many portable, high-pressure gas cylinders.

As a further advantage, multiple, relatively compact springs are distributed over the surface of the disc-shaped member 33 at locations which are spaced from the center; in this way the necessary resistance to movement of disc-shaped member 33 in a generally planar, space-saving structure.

The overall weight of the regulator is reduced by virtue of not only the reduced length but also by the novel positioning of the mounting member 43. This reduced weight becomes especially advantageous when the regulator is used in mobile situations or with ambulatory patients.

The invention having been disclosed in connection with the foregoing variations and examples, additional variations will now be apparent to persons skilled in the art. The invention is not intended to be limited to the variations specifically described above, and accordingly, reference should be made to the appended claims rather than the foregoing discussion of preferred examples to access the scope of the invention in which exclusive rights are claimed.

What is claimed is:

1. A compact gas pressure regulator comprising:

a housing having inlet and outlet ends, a longitudinal axis, and inner walls defining a chamber, the inner walls including a transverse inner wall located between the outlet end and the chamber;

means for sealing the chamber to create a zone above atmospheric pressure;

an orifice in the housing for receiving gas at a source pressure;

an outlet in the housing for delivering gas at a delivery pressure lower than the source pressure;

a substantially disc-shaped member movably mounted within the housing, the disc-shaped member having a center and first and second opposite surfaces, the first surface having a seat opposing the orifice, the second surface and one of the walls of the chamber defining a head region in communication with the outlet; and spring means biased against the disc-shaped member, the spring means extending outwardly from the first surface and exerting force on the disc-shaped member at multiple, discrete locations which are angularly separated from each other about the area of the first surface, the disc-shaped member and the seat being displaced a predetermined amount toward the orifice and against the bias of the spring means in response to the pressure of gas received in the head region, thereby regulating the delivery pressure;

a yoke extending longitudinally from the inlet end of the housing, the yoke having arms secured to the housing and extended therefrom, the arms having inner arm surfaces defining a yoke aperture therebetween, the inner arm surfaces located a first radial distance from the longitudinal axis;

a mounting member secured to the housing and having sides extending generally outwardly from and transversely to the longitudinal axis; and a bore extending through the mounting member adapted to receive a pressure gauge therein, the bore terminating in a bottom which is radially spaced from the longitudinal axis by a second radial distance greater than the first distance, the bottom of the bore located relative to the chamber so as not to be interposed between the transverse wall of the chamber and the outlet end of the housing.

2. The regulator of claim 1, wherein the mounting member is block shaped and secured at one of the arms of the yoke.

3. The regulator of claim 1, wherein the spring means comprises a plurality of helical springs having longitudinal spring axes, wherein the chamber has a longitudinal chamber axis, the disc-shaped member being coaxially aligned with the longitudinal chamber axis, the spring axes being laterally spaced from and substantially parallel to the chamber axis, the disc-shaped member being axially moveable within the chamber.

4. The regulator of claim 1, wherein the spring means comprises a spring washer.

5. The regulator of claim 1, wherein the disc-shaped member is cast metal and includes a pair of passages adjacent to the seat and extending between the opposite surfaces to allow gas to flow from one side of the disc-shaped member to the other side.

6. The regulator of claim 3, comprising four of the springs spaced symmetrically on the first surface.

7. The regulator of claim 1 for use with a source pressure of about 2000 psi, and wherein the spring means is selected to resist movement of the seat toward the orifice by an amount sufficient to maintain the delivery pressure under about 100 psi.

8. The regulator of claim 1, further comprising means for permitting flow of gas through said disc-shaped member to the head region, and wherein the disc-shaped member including the seat is mounted for movement within the chamber between first and second positions, the first position located closer to the orifice than the second position to restrict entry of gas through the orifice, the second position located further from the orifice than the first position to increase entry of gas through the orifice.

9. A compact gas pressure regulator for a high-pressure gas cylinder, comprising:

a housing having inner walls defining a chamber, the chamber having first and second, longitudinally spaced, inner walls;

means for sealing the chamber to create a zone above atmospheric pressure;

an orifice in the housing for receiving gas at a source pressure;

an outlet in the housing for delivering gas at a delivery pressure lower than the source pressure;

a yoke extending from the housing and defining an aperture adjacent to the orifice for receiving the high-pressure tank;

a T-clamp mounted to the yoke for securing the regulator to the tank;

a member for mounting a pressure gauge on the housing, the mounting member having a bore therein in communication with the orifice, the housing having a generally circular, cross-sectional footprint and a length, the mounting member extending outwardly from the footprint without substantially increasing the length of the housing;

a substantially disc-shaped member movably mounted within the housing, the disc-shaped member having a center and first and second opposite surfaces, the disc-shaped member and the chamber having a common central axis of symmetry, a plurality of pins extending from the first inner wall toward the first surface;

a plurality of helical springs longitudinally received on the pins and biased against the first surface, the first surface having an annular groove, the springs being received in the groove, the pins including the springs received thereon being radially spaced from the central axis by a predetermined distance and positioned relative to each other at regular angular intervals; and a seat on the first surface, the seat positioned to oppose the orifice;

the second surface and the second inner wall defining a head region in communication with the outlet;

the disc-shaped member and the seat being displaced a predetermined amount toward the orifice and against the bias of the springs in response to the pressure of gas received in the head region, thereby regulating the delivery pressure.

10. The regulator of claim 9, wherein the length of the housing is so dimensioned to maintain the regulator within the cross-sectional footprint of the cylinder when the regulator is attached to the high-pressure cylinder.

11. The regulator of claim 9 comprising four springs, wherein each of the springs is angularly spaced from and adjacent space by an angle of about 90 degrees.

12. The regulator of claim 9 wherein the mounting member comprises a block.

13. The regulator of claim 9, further comprising a pair of passages adjacent to the seat and having openings at the opposite surfaces of the disc-shaped member to allow gas to flow from one side of the disc-shaped member to the other side, the passages extending between the opposite surfaces.

14. A gas delivery apparatus comprising:

a high-pressure gas cylinder having a high pressure outlet and a cross-sectional footprint;

a gas pressure regulator secured to the cylinder, the regulator comprising:

a housing having inlet and outlet ends, a longitudinal axis, and inner walls defining a chamber, the inner walls including a transverse inner wall located between the outlet end and the chamber;

means for sealing the chamber to create at least one zone above atmospheric pressure;

an orifice in the housing for receiving gas at a source pressure;

an outlet in the housing for delivering gas at a delivery pressure lower than the source pressure;

a substantially disc-shaped member movably mounted within the housing, the disc-shaped member having a center and first and second opposite surfaces, the first surface having a seat opposing the orifice, the second surface and one of the walls of the chamber defining a head region in communication with the outlet; and spring means biased against the disc-shaped member, the spring means extending outwardly from the first surface and exerting force on the disc-shaped member at multiple, discrete locations which are angularly separated from each other about the area of the first surface;

the disc-shaped member and the seat being displaced a predetermined amount toward the orifice and against the bias of the spring means in response to the pressure of gas received in the head region, thereby regulating the delivery pressure;

a yoke extending longitudinally from the inlet end of the housing, the yoke having arms secured to the housing and extending therefrom, the arms having inner arm surfaces defining a yoke aperture therebetween, the inner arm surfaces located a first radial distance from the longitudinal axis;

a mounting member secured to the housing and having sides extending generally outwardly from and transversely to the longitudinal axis, a bore extending through the mounting member adapted to receive a pressure gauge therein, the bore terminating in a bottom which is radially spaced from the longitudinal axis by second radial distance greater than the first distance, the bottom of the bore located relative to the chamber so as not to be interposed between the transverse wall of the chamber and the outlet end of the housing;

the housing having a generally circular, cross-sectional footprint and a length, the mounting member extending outwardly from the footprint without substantially increasing the length of the housing, the housing not extending beyond the footprint of the cylinder.

15. A compact gas pressure regulator comprising:

a housing having inner walls defining a chamber;

means for sealing the chamber to create a zone above atmospheric pressure;

a substantially disc-shaped member movably mounted within the chamber, the disc-shaped member having a center, and first and second opposite surfaces, the first surface having an inner and outer peripheral wall extending therefrom, the first surface having portions adapted to engage with means for biasing the disc-shaped member;

a seat defined on the first surface of the disc-shaped member within the perimeter of the inner peripheral wall, the outer peripheral wall terminating in a lip which projects radially outwardly to form a flange at the underside of the lip, the flange sized to receive an O-ring thereon;

the seat having portions defining a pair of individual, substantially independent passages, each passage having a first opening on the first surface and a second opening on the second surface, the passages extending longitudinally between the first and second openings;

wherein the passages have first portions of a first diameter extending from the first openings and second portions of a second diameter greater than the first diameter extending from the second openings.

16. The regulator of claim 15, wherein the disc-shaped member is made of material selected from the group consisting of cast metal and forged metal.

17. A compact gas pressure regulator comprising:

a housing having inner walls defining chamber;

means for sealing the chamber to create a zone above atmospheric pressure;

a substantially disc-shaped member movably mounted within the chamber, the disc-shaped member having a center, and first and second opposite surfaces, the first surface having an inner and outer peripheral wall extending therefrom, the first surface having portions adapted to engage with means for biasing the disc-shaped member;

a seat first defined on the surface of the disc-shaped member within the perimeter of the inner peripheral wall, the outer peripheral wall terminating in a lip which projects radially outwardly to form a flange at the underside of the lip, the flange sized to receive an O-ring thereon;

the seat having portions defining a pair of passages, each passage having a first opening on the first surface and a second opening on the second surface, the passages extending longitudinally between the first and second openings;

wherein the disc-shaped member is made of material selected from the group consisting of cast metal and forged metal, and wherein the passages have first portions of a first diameter extending from the first openings and second portions of a second diameter greater than the first diameter extending from the second openings;

wherein the seat comprises a central cavity and a sealing member received in the central cavity, the first portions in communication with the central cavity and adjacent to the sealing member.

18. A compact gas pressure regulator comprising:

a housing having inner walls defining a chamber;

means for sealing the chamber to create a zone above atmospheric pressure;

an orifice in the housing for receiving gas at a source pressure;

an outlet in the housing for delivering gas at a delivery pressure lower than the source pressure;

a substantially disc-shaped member movably mounted within the housing, the disc-shaped member having a center and first and second opposite surfaces, the first surface having a seat opposing the orifice, the second surface and one of the walls of the chamber defining a head region in communication with the outlet; and spring means biased against the disc-shaped member, the spring means extending outwardly from the first surface and exerting force on the disc-shaped member at multiple, discrete locations which are angularly separated from each other about the area of the first surface.

the disc-shaped member and the seat being displaced a predetermined amount toward the orifice and against the bias of the spring means in response to the pressure of gas received in the head region, thereby regulating the delivery pressure;

wherein the spring means comprises a plurality of helical springs having longitudinal spring axes, wherein the chamber has a longitudinal chamber axis, the disc-shaped member being coaxially aligned with the longitudinal chamber axis, the spring axes being laterally spaced from and substantially parallel to the chamber axis, the disc-shaped member being axially moveable within the chamber;

wherein the inner walls include an inner transverse wall longitudinally spaced from the disc-shaped member, the transverse wall having at least two pins extending toward the first surface of the disc-shaped member, the springs being longitudinally received on the pins and extending between the transverse wall and the disc-shaped member.

19. A compact gas pressure regulator comprising:

a housing having inlet and outlet ends, a longitudinal axis, and inner walls, the inner walls defining a chamber, the inner walls including a transverse inner wall located between the outlet end and the chamber;

a yoke extending longitudinally from the inlet end of the housing, the yoke having arms secured to the housing and extending therefrom, the arms having inner arm surfaces defining a yoke aperture therebetween, the inner arm surfaces located a first radial distance from the longitudinal axis;

a mounting member secured to the housing and having sides extending generally outwardly from and transversely to the longitudinal axis, a bore extending through the mounting member adapted to receive a pressure gauge therein, the bore terminating in a bottom which is radially spaced from the longitudinal axis by a second radial distance greater than the first distance, the bottom of the bore located relative to the chamber so as not to be interposed between the transverse wall of the chamber and the outlet end of the housing.

20. The regulator of claim 19, wherein the mounting member is block shaped and secured at one of the arms of the yoke.

* * * * *